H. E. MORTON.
JIG.
APPLICATION FILED JAN. 24, 1914.

1,145,260.

Patented July 6, 1915.
3 SHEETS—SHEET 1.

Witnesses

Inventor
Henry E. Morton
By Luther V. Moulton
Attorney.

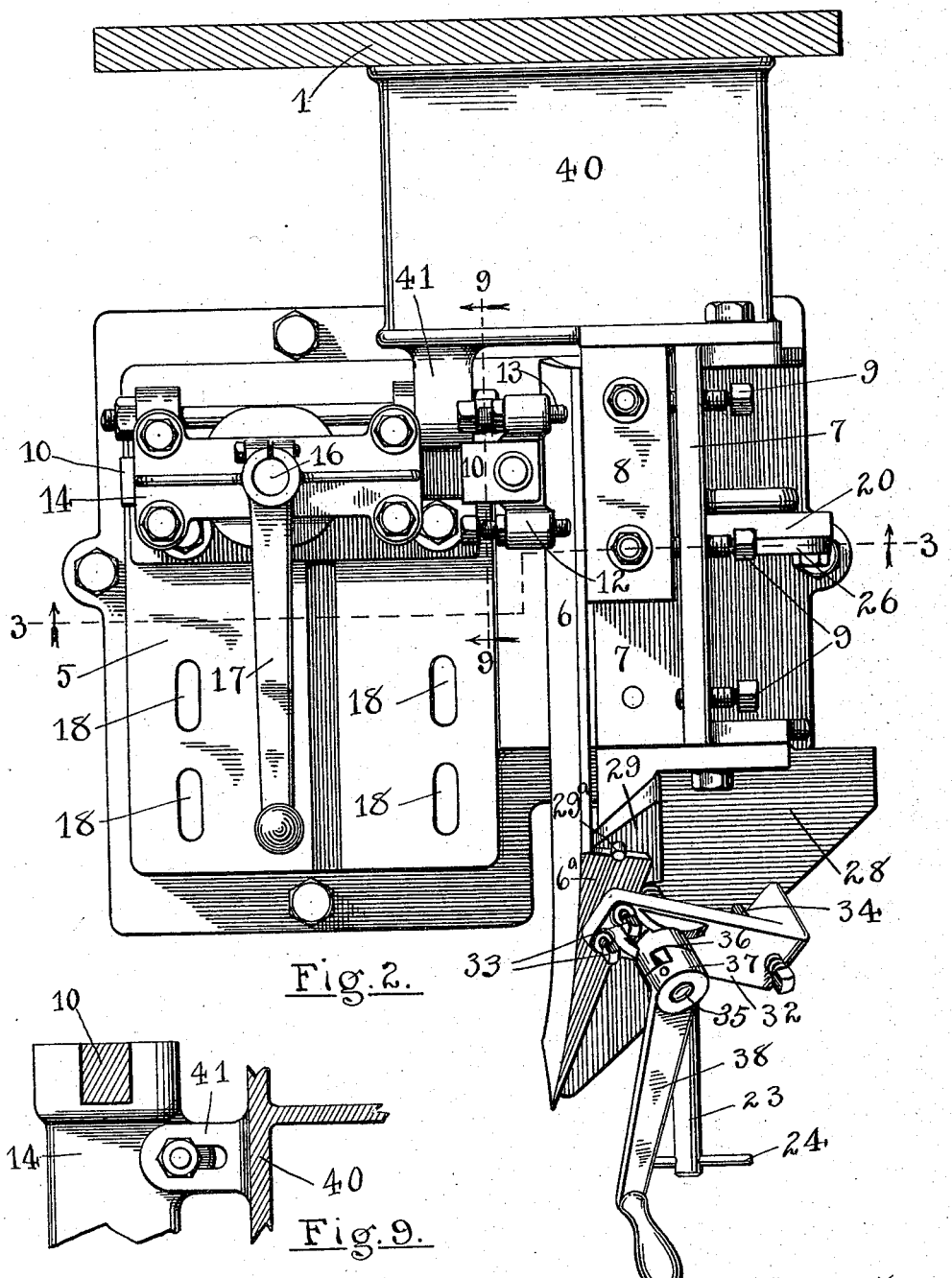

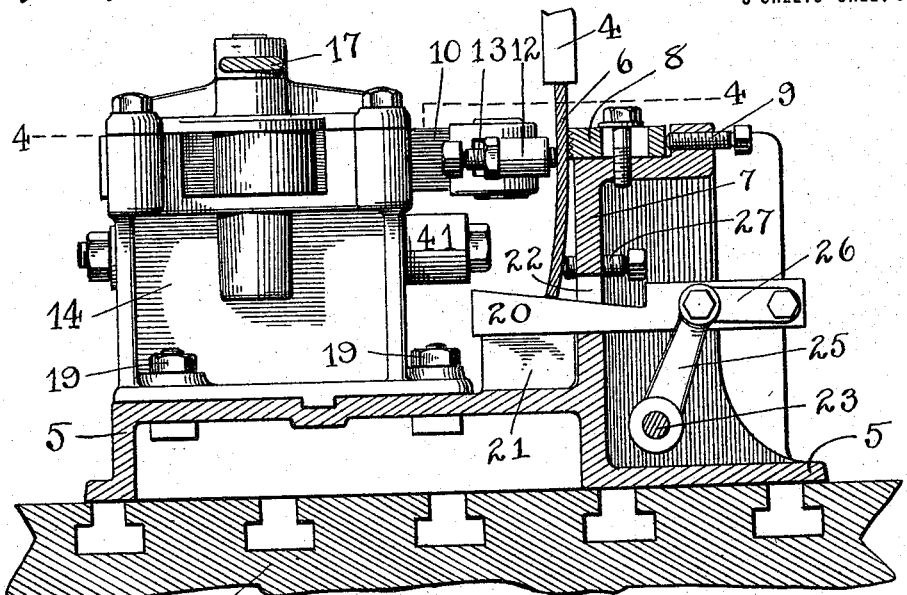
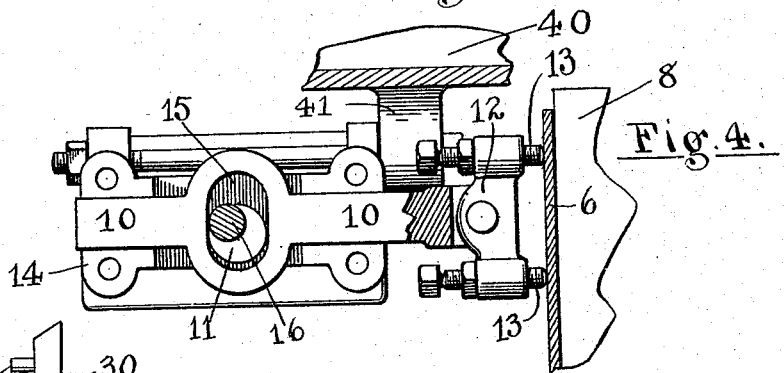
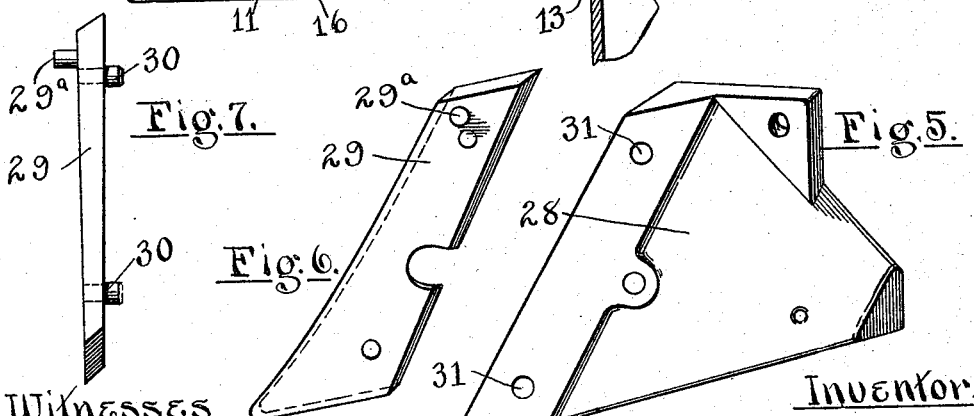

UNITED STATES PATENT OFFICE.

HENRY E. MORTON, OF MUSKEGON HEIGHTS, MICHIGAN.

JIG.

1,145,260.   Specification of Letters Patent.   Patented July 6, 1915.

Application filed January 24, 1914. Serial No. 814,112.

*To all whom it may concern:*

Be it known that I, HENRY E. MORTON, a citizen of the United States of America, residing at Muskegon Heights, in the county of Muskegon and State of Michigan, have invented certain new and useful Improvements in Jigs; and I do hereby declare the following to be a full, clear, and exact description of the invention, such as will enable others skilled in the art to which it appertains to make and use the same.

My invention relates to improvements in jigs, and more particularly to jigs adapted to clamp plow shares or like objects in place on a shaper or other like machine, and its object is to provide a jig which may be readily adjusted to receive plow shares or similar objects of various irregular shapes; to provide the jig with means whereby the plow share or other article may be quickly adjusted and clamped in position to be operated on, and easily released therefrom, and to provide the device with various new and useful features hereinafter more fully described and particularly pointed out in the claims.

In the manufacture of plow shares it is customary to smooth or plane the edge thereof, which joins the mold board, and, as plow shares are very irregular in shape and the shares for different types of plows differ in curvature and configuration, it has been found difficult to provide a device which will accommodate different styles of plow shares, and clamp them in the proper position to be operated upon by the cutting tool of the machine.

My invention supplies certain desirable features, and is embodied in mechanism substantially as shown in the accompanying drawings, in which:—

Figure 1:
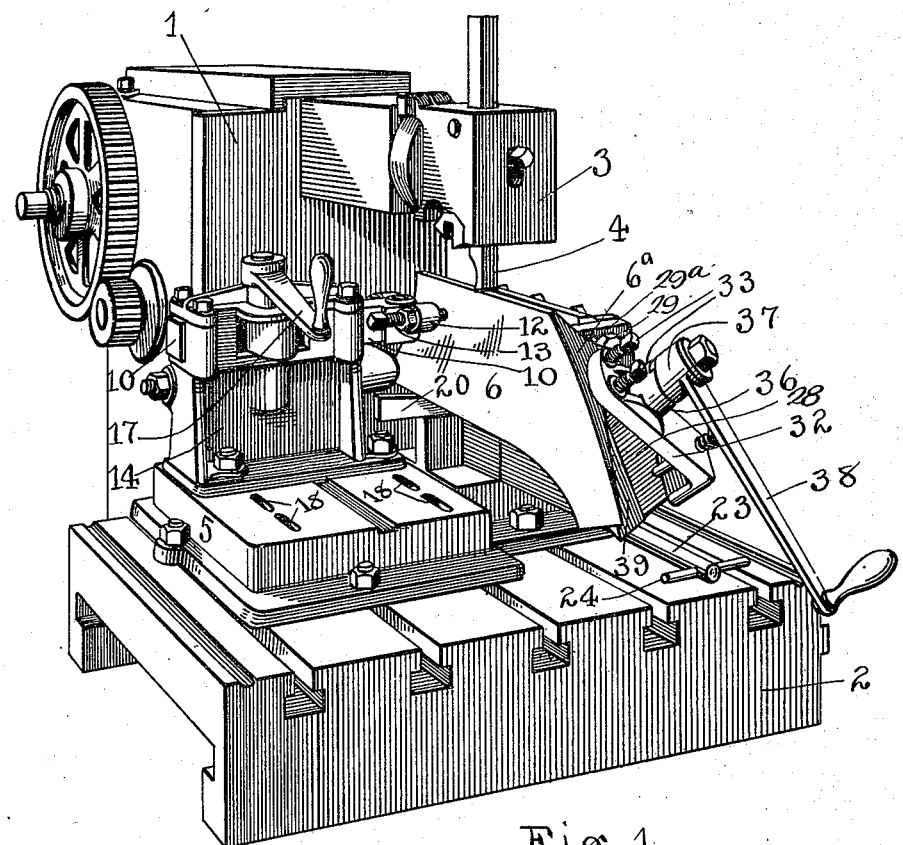
Figure 8:
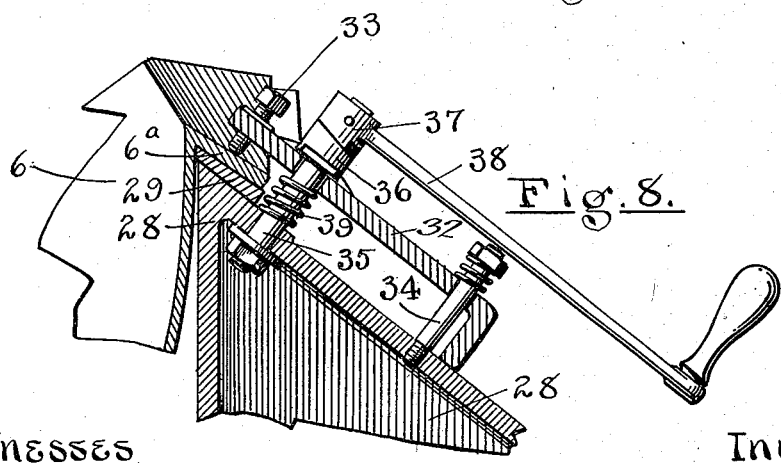

Figure 1 is a perspective view of a portion of a shaping machine with the jig embodying my invention in operative position thereon, and a plow share clamped thereby in position to be operated upon by the cutting tool; Fig. 2 is a plan view of the jig with a plow share clamped therein; Fig. 3 is a sectional elevation on the line 3—3 of Fig. 2; Fig. 4 is a sectional plan of a portion of the device on the line 4—4 of Fig. 3; Fig. 5 is a perspective view of the gunnel clamping extension; Fig. 6 is a perspective view of the filler block; Fig. 7 is an edge view of the same; Fig. 8 is a sectional view of the gunnel clamping mechanism; and Fig. 9 is a sectional elevation on the line 9—9 of Fig. 2 showing details of construction.

Like numbers refer to like parts in all of the figures.

1 represents the frame of a shaping machine which has a table 2 adjustably mounted thereon in the usual way and a reciprocable ram 3 in which the cutting tool 4 is fixed. The jig has a base 5 adapted to be clamped or bolted to the table 2. The plow share 6, when in the jig, is located above this base in a substantially vertical plane. The base is provided with a vertical extension 7 which has a clamping block 8 adjustably bolted to its upper surface and adapted to engage the rear surface of the plow share near the upper edge thereof. The thrust of the plow share against this block 8 is taken by the adjusting screws 9 which engage the back side of the block, and these screws 9 are also used to adjust the angular position of the block upon the extension 7 to conform to the surface of the plow share.

Opposite the clamping block 8 is a ram 10, adjusted by an eccentric 11, and this ram carries a pivoted cross beam 12 on its inner end, the said cross beam being provided at its respective ends with adjustable bearing screws 13 adapted to engage the face of the plow share and press it against the clamping block 8. The ram 10 is slidably mounted in a standard 14 adjustably bolted to the base 5 of the jig, and is provided near its center with a transverse slot 15 in which the eccentric 11 operates. Said eccentric is fixed on a shaft 16 journaled in the standard 14 and provided on its upper end with a lever 17 by which it is manually rotated. The pivotal connection of the cross beam 12 with the forward end of the ram 10 permits it to automatically accommodate itself to the angularity of the face of the plow share. It will be noted that there are several slotted openings 18 in the base 5 to receive the bolts 19, by which the standard 14 is clamped thereon. This permits the standard, together with the clamping ram to be moved to the most desirable location for the particular shape of plow share to be clamped in the jig.

The lower edge of the plow share 6 is supported by a wedge block 20, which slides upon a supporting projection 21 on the base and which extends through an aperture 22 in the upward extension 7. This wedge block is adapted to be moved so that its surface will engage the lower edge of the plow share when the same is adjusted to its proper height in the jig by means of a rotatable shaft 23, journaled in the base of the jig and projecting from the forward side thereof, its outer end being provided with a cross bar 24 which serves as a hand grip by which the said shaft may be manually rotated. The inner end of the shaft is provided with a lever 25 connected by a link 26 to the wedge block 20, thus permitting the wedge block to be moved longitudinally by the manual rotation of the shaft 23.

The lower edge of the plow share curves away from the upward extension 7 and is engaged by adjustable bearing screws 27 in the said extension against which the share is thrust by the ram 10.

The point of the plow share has a projecting member known as the gunnel, which joins the share at an acute angle and extends from the rear side thereof, and when in position on the plow joins the landside thereof and forms the point of the same. An angular extension 28 is fastened to the forward side of the extension 7 and is approximately the proper shape to fit into the angle formed by the juncture of the share and gunnel. Owing to the different shapes and angles of different shares it is impossible to make this angular extension the proper shape to fit all of them, and a detachable filler block 29 is provided of the proper shape to fit each separate style of plow share. These filler blocks are provided with dowels 30 which enter openings 31 in the surface of the angular extension 28 to locate and detachably retain them in operative position. Each filler block is also preferably provided with a projecting stop pin 29ª adapted to be engaged by the edge of the gunnel to properly locate it.

When the plow share is in position in the jig the gunnel 6ª thereof will rest upon the filler block 29, and a clamping bar 32 is provided to clamp the gunnel against the filler block. This clamping bar is provided with adjustable bearing screws 33 in one of its ends which engage the gunnel, while the other end is turned at right angles and rests upon the surface of the extension 28 being retained thereon by a stud 34. A bolt 35 passes through the bar 32 intermediate its ends, preferably closer to the clamping end, and is rotatably fastened to the extension 28. A non-rotatable cam block 36 surrounds the said bolt and engages the upper surface of the bar 32 and a corresponding co-acting cam block 37 is fixed on the bolt 35 and is provided with a hand lever 38, by which it may be manually rotated. The engaging surfaces of the cam blocks 36 and 37 are spirally inclined and rotation of the upper block 37 by means of the lever 38 tends to move the clamping end of the bar 32 toward or away from the gunnel 6ª, thus either clamping or releasing the same. A spring 39 beneath the clamping bar 32 normally holds the same raised and facilitates placing the gunnel beneath it.

This device is particularly adapted to be used on the so-called draw cut type of shaper, in which the cutting stroke of the tool is toward the upright frame of the machine and for this reason a brace member 40 is provided, which is bolted to the rear side of the extension 7 of the jig and engages a vertical surface of the frame 1 of the shaper to brace the jig against the strain of the cutting tool. This brace is also provided with a slotted extension 41 to which the standard 14 may be bolted to reinforce and strengthen the whole structure.

From the foregoing description it will be seen that this device is adapted to accommodate a great variety of shapes of plow shares. The detachable filler block 29 is made to fit the inside angle of the juncture of the gunnel and plow share. This in then placed upon the extension 28 and the bearing screws 33 adjusted to engage the outer surface of the gunnel to clamp it against the filler block when the clamping bar 32 is moved downward by action of the lever 38. The wedge block 20 engages the lower edge of the share and supports it at the desired height. The clamping block 8 may be adjusted to conform to the angularity of the rear surface of the plow share and the standard 14, carrying the clamping ram 10, may be moved to the most desirable location to clamp the share against the said clamping block. The bearing screws 27 are also adapted to be adjusted to conform to the curvature of the plow share.

After this device has been adjusted to receive and clamp one form of plow share, other shares of the same style may be quickly clamped therein as follows: Assuming the different clamping means to be in released position, the share is placed in the jig and the gunnel thereof is adjusted against the stop pin 29ª; the lever 38 is then moved to operate the gunnel clamping means. When the gunnel has been clamped firmly in position the plow share is suspended in its proper position but is not clamped firmly in place. The shaft 23 is then manually rotated, which moves the wedge block 20 into engagement with the lower edge of the plow share, supporting the same, and the clamping ram 10 is then moved forward by means of the lever 17 bringing the screws 13 on the pivoted beam 12 into engagement with the outer surface of the plow share and clamping it firmly against the clamping block 8 and the screws 27. The share is now rigidly held in proper position to be operated upon by the cutting tool 4 after which the share is released by the reverse movement of the various levers, etc., and another share placed in operative position and the operation repeated.

It will be seen that after this jig has once been adjusted to a particular style and shape of plow share, that the operation of clamping the subsequent shares of the same style therein is exceedingly simple and consists only of manipulating the levers 17 and 28 and the shaft 23. By the use of this device the output of a shaping machine may be greatly increased and the labor of its operator materially lessened.

What I claim is:—

1. A plow share jig, comprising a base having a vertical extension, means for supporting and clamping the share against the said extension, an angular extension to support the gunnel of the plow share, and means for clamping the gunnel against said angular extension.

2. A plow share jig, comprising a base having a vertical extension, a clamping block adjustable in a horizontal plane near the top of said extension, and means for clamping the plow share against said block in a substantially vertical plane.

3. A plow share jig, comprising a base having a vertical extension, a standard adjustably mounted on the base opposite the extension, a clamping ram longitudinally movable in said standard, and a cam operated by a hand lever and adapted to move the ram against the plow share to clamp the same against the said vertical extension.

4. A plow share jig, comprising a base having a vertical extension, a clamping block adjustable in a horizontal plane near the top of the extension, a standard adjustably mounted on the base opposite the extension, a clamping ram longitudinally slidable in the standard and having a transverse slot, a cross beam pivoted on one end of the ram, adjustable bearing screws in the respective ends of the said cross beam, and a cam in said transverse slot journaled in the standard and provided with a hand lever to move the ram and engage the bearing screws with the plow share to clamp the same against the said clamping block.

5. A plow share jig, comprising a base, a slidable wedge block to adjustably support the plow share, means for adjusting the wedge block, and means for clamping the share to the base.

6. A plow share jig, comprising a base, a slidable wedge block to support the lower edge of the share, a shaft journaled in the base and adapted to be manually oscillated, an arm on said shaft, a connecting rod connecting said arm to the wedge block to move the same, and means for clamping the share in a substantially vertical plane.

7. A plow share jig, comprising a base having a vertical extension, a clamping block horizontally adjustable near the top of said extension, adjustable bearing screws projecting from said extension, a standard adjustably mounted on the base opposite the extension, a ram longitudinally slidable in said standard, a cam provided with a hand lever and adapted to adjust the ram, a cross beam pivoted to the forward end of the ram, adjustable bearing screws in the respective ends of the cross beam to engage the plow share and clamp it against the clamping block, and bearing screws on the extension, a slidable wedge block to engage the lower edge of the share, a shaft journaled in the base and adapted to be manually oscillated, and an arm on the shaft connected to the wedge block to move the same.

8. A plow share jig, comprising a base having an angular extension to support the gunnel of the plow share, means for clamping the gunnel to the extension, and means on the base for supporting and clamping the share.

9. A plow share jig, comprising a base having an angular extension to support the gunnel of a plow share, a clamping bar engaging the extension at one end and adapted to engage the gunnel at the other end, means intermediate the ends of the bar for pressing the same downward, and means on the base for supporting and clamping the share.

10. A plow share jig, comprising a base having an angular extension to support the gunnel of a plow share, a clamping bar engaging the extension at one end and adapted to engage the gunnel at its other end, a bolt projecting from the extension through the clamping bar intermediate its ends, a non-rotative cam block surrounding the bolt and engaging the clamping bar, a rotative cam block provided with a hand lever and fixed to said bolt, and means on the base for supporting and clamping the share.

11. A plow share jig, comprising a base having an angular extension, a filler block detachably mounted on the extension and adapted to fit the under surface of the gunnel of a plow share to support the same, means for clamping the gunnel against the filler block, and means on the base for supporting and clamping the share.

12. A plow share jig, comprising a base having an angular extension, a filler block detachably mounted on the extension adapted to fit the under surface of the gunnel of a plow share, a stop pin on the filler block to adjust the position of the gunnel thereon, a clamping bar engaging the extension at one end and adapted to engage the gunnel at its other end, means intermediate its ends for clamping the bar against the gunnel, and means on the base for supporting and clamping the share.

13. A plow share jig, comprising a base having a vertical extension, a clamping block adjustable in a horizontal plane near the top of said extension, means for clamping the plow share against the clamping block in a substantially vertical plane, a support for the gunnel of the share, and means for clamping the gunnel to the support.

14. A plow share jig, comprising a base having a vertical extension, a standard adjustably mounted on the base opposite the extension, a clamping ram longitudinally movable in said standard, a cam operated by a hand lever and adapted to move the ram toward the plow share to clamp the same against the said vertical extension, a support for the gunnel of the share, and means for clamping the gunnel to the support.

15. A plow share jig, comprising a base having a vertical extension, a clamping block adjustable in a horizontal plane near the top of the extension, a standard adjustably mounted on the base opposite the extension, a ram longitudinally slidable in the standard and having a transverse slot, a cross beam pivoted on one end of the ram, adjustable bearing screws in the respective ends of the said cross beam, a cam in said transverse slot journaled in the standard and provided with a hand lever to move the ram and engage the bearing screws with the plow share, a support for the gunnel of the share, and means for clamping the gunnel to the support.

16. A plow share jig, comprising a base, a slidable wedge block to adjustably support the plow share, means for moving the wedge, means on the base for clamping the share, a support for the gunnel of the share, and means for clamping the gunnel to the support.

17. A plow share jig, comprising a base, a slidable wedge to support the lower edge of the share, a shaft journaled in the base and adapted to be manually oscillated, an arm on said shaft, a rod connecting said arm to the wedge block to move the same, means for clamping the share in a substantially vertical plane, a support for the gunnel of the share, and means for clamping the gunnel to the support.

18. A plow share jig, comprising a base having a vertical extension, a clamping block adjustable in a horizontal plane near the top of said extension, adjustable bearing screws projecting from said extension, a standard adjustably mounted on the base opposite the extension, a ram longitudinally slidable in said standard, a cam provided with a hand lever and adapted to move the ram, a cross beam pivoted to the forward end of the ram, adjustable bearing screws in the respective ends of the cross beam to engage the plow share and clamp it against the clamping block and bearing screws on the extension, a slidable wedge block to engage the lower edge of the share, a shaft journaled in the base and adapted to be manually oscillated, an arm on the shaft connected to the wedge block to move the same, a support for the gunnel of the share, and means for clamping the gunnel to the support.

In testimony whereof I affix my signature in presence of two witnesses.

HENRY E. MORTON.

Witnesses:
W. H. STAUFFER,
ALEX. VAN ZANTEN.

Copies of this patent may be obtained for five cents each, by addressing the "Commissioner of Patents, Washington, D. C."